US006805044B1

(12) United States Patent
Yamamoto

(10) Patent No.: US 6,805,044 B1
(45) Date of Patent: Oct. 19, 2004

(54) VEGETABLE CUTTING UTENSIL

(75) Inventor: Hajime Yamamoto, Iwakuni (JP)

(73) Assignee: Benriner Co., Ltd., Yamaguchi-ken (JP)

( * ) Notice: Subject to any disclaimer, the term of this patent is extended or adjusted under 35 U.S.C. 154(b) by 0 days.

(21) Appl. No.: 10/634,048

(22) Filed: Aug. 4, 2003

(51) Int. Cl.[7] .............................. A23L 1/00; B26D 1/03; B26D 3/26

(52) U.S. Cl. .............................. 99/537; 83/856; 83/857; 83/932; 99/588

(58) Field of Search .......................... 99/537, 538, 495, 99/499–508, 588; 83/932, 856–858; 241/94, 100, 273.1, 292.1, 37.5; 30/279.2, 279.6, 280, 278, 283, 122; D7/678, 695

(56) References Cited

U.S. PATENT DOCUMENTS 4,733,588 A * 3/1988 Yamamoto .................... 83/857
5,148,731 A * 9/1992 Boerner ........................ 83/857
5,765,472 A * 6/1998 Kim ............................ 99/537
6,053,098 A * 4/2000 Yamamoto .................... 99/538

* cited by examiner

*Primary Examiner*—Timothy F. Simone
(74) *Attorney, Agent, or Firm*—Fattibene & Fattibene; Paul A. Fattibene; Arthur T. Fattibene

(57) ABSTRACT

In the vegetable cutting utensil constructed in such a way that grooves which are oppositely disposed in a diagonal direction and which are drilled in a horizontal direction on approximately central portions of left and right frame parts in the longitudinal direction of a cutting utensil main body are provided, that a flat blade is inserted into the grooves to be disposed across the left and right frame parts, that a reception plate is fixedly mounted integral with the left and right frame parts in a front side with respect to the flat blade, and that a regulating reception plate which is rotatably attached to the left and right frame parts in a rear side with respect to the flat blade is disposed, respective pivot pins protrude toward an inner side on inside portions near rear ends of the left and right frame parts while respective engaging holes are formed on both side portions near rear ends of the regulating reception plate, and respective opening portions are provided on the engaging holes.

7 Claims, 11 Drawing Sheets

VEGETABLE CUTTING UTENSIL

BACKGROUND OF THE INVENTION

1. Field of the Invention

The present invention relates to a vegetable cutting utensil and in particular to a vegetable cooking utensil which is provided with a flat blade and a comb blade, constructed so as to shred vegetables and the like.

2. Description of the Prior Art

The present applicant has already filed a patent application regarding this conventional type of vegetable cutting utensil now U.S. Pat. No. 4,733,588, and this vegetable cutting utensil is explained according to FIGS. 6 to 11. In FIG. 6, the reference numeral 1 denotes a vegetable cutting utensil, and this vegetable cutting utensil 1 consists of a vegetable cutting utensil main body 2 which is made of a hard synthetic resin formed into a roughly rectangle in a plan view, a metal flat blade 3 which is removably attached to the vegetable cutting utensil main body 2, and a metal comb blade 4 which is removably attached parallel to the flat blade 3. The vegetable cutting utensil main body 2 consists of left and right frame parts 5, 5 provided to be spaced apart at a predetermined space, a reception plate 6 fixed on a front half portion (a left half portion in the drawing) between the left and right frame parts 5, 5, a regulating reception plate 7 rotatably arranged on a rear half portion (a right half portion in the drawing) between the left and right frame parts 5, 5, and a graspable holding body 8 which is arranged across the left and right frame parts 5, 5 so as to couple them on a rear half portion of the left and right frame parts 5, 5.

Further, the vegetable cutting utensil main body 2 has grooves 9, 9 which are oppositely disposed in a diagonal direction and which are drilled in a horizontal direction on approximately central portions in the longitudinal direction of the left and right frame parts 5, 5, so that the flat blade 3 shown in FIG. 7 is inserted from one of the grooves 9, 9 so that both end portions 3*a*, 3*a* of the flat blade 3 are positioned on the grooves 9, 9, and a middle part of the flat blade 3 is supported in a removable way on a step portion 6*a* which is formed on a rear end of the reception plate 6.

The vegetable cutting utensil main body 2 is constructed so that the flat blade 3 can be fixed on the grooves 9, 9 by providing screw tubes 10, 10 on positions which are on undersides of the left and right frame parts 5, 5 and on positions of the grooves 9, 9 as shown in FIG. 8, screwing respective screws 11, 11 from the undersides of the screw tubes 10, 10, and pressing the flat blade 3 against upper wall surfaces of the grooves 9, 9 while pressing both respective end portions of the flat blade 3 by distal end portions of the screws 11, 11.

The comb blade 4 is juxtaposed with the flat blade 3 so as to be perpendicular to the flat blade 3 while being spaced apart from the flat blade 3 at a predetermined space, and the comb blade 4 is disposed across the left and right frame parts 5, 5 and is fixed by means of comb blade fixing screws 12, 12 which are screwed from side portions of the left and right frame parts 5, 5 toward the inner side.

Further, as shown in FIG. 9, pivot pins 13, 13 protrude on rear end portions of the side portions of the regulating reception plate 7, while as shown in FIG. 10, pivot grooves 14, 14 which are opened to the inner side and rear sides of the left and right frame parts 5, 5 are formed on rear ends of the left and right frame parts 5, 5 so that the pivot pins 13, 13 of the regulating reception plate 7 are inserted into the pivot grooves 14, 14.

Moreover, the vegetable cutting utensil main body 2 is constructed so that shredding thickness of a vegetable can be changed by providing a stay 15, which is disposed across the left and right frame parts 5, 5, on an underside of the regulating reception plate 7 as shown in FIG. 8, by screwing a regulation screw 16 from an underside of a central portion of the stay 15 so that a distal end of the regulation screw 16 removably holds the bottom surface of the regulating reception plate 7, and by varying screwing amount of the regulation screw 16 so that respective protruding lengths of the comb blade 4 and the flat blade 3 protruding upwardly from a sliding movement guiding surface that is the upper surface of the regulating reception plate 7 are regulated.

As shown in FIG. 11, protruding portions 17, 17 which protrude forwardly are formed near both end portions of the front surface of the holding body 8, and holes 18, 18 extending vertically are drilled in the protruding portions 17, 17 while holding body fixing holes 19, 19 are threaded on rear ends of the left and right frame parts 5, 5 shown in FIG. 10. After the pivot pins 13, 13 are inserted into the pivot grooves 14, 14, the protruding portions 17, 17 provided on the holding body 8 are inserted so that positioning of the holes 18, 18 drilled in the protruding portions 17, 17 and the holding body fixing holes 19, 19 are performed. Thereafter, screws 20, 20 shown in FIG. 6 are screwed into the holding body fixing holes 19, 19 and the holes 18, 18 of the protruding portions 17, 17 to fix the holding body 8.

Thus, rear end opening portions 14*a*, 14*a* of the pivot grooves 14, 14 are closed by the protruding portions 17, 17, and detachment of the pivot pins 13, 13 is restricted, and as a result, the regulating reception plate 7 can vertically rotate, taking the pivot pins 13, 13 as supporting points of the rotation.

When a vegetable or the like is cut while being slidingly rubbed with the upper surfaces of the reception plate 6 and the regulating reception plate 7, the comb blade 4 scores, and long, thin shredded pieces sliced by the flat blade 3 fall from a gap between the edges of the comb blade 4 and the flat blade 3. It is also possible to remove the comb blade 4 and use only the flat blade 3. In this case, belt-like thin pieces can be obtained.

The above described conventional vegetable cutting utensil is constructed in such a manner that the pivot grooves which are opened to the inner side and the rear sides of left and right frame parts are formed on the rear ends of the left and right frame parts of the vegetable cutting utensil main body, that the pivot pins of a regulating reception plate are inserted into the pivot grooves, and that the protrrding portions provided on the holding body are inserted so that the regulating reception plate can rotate freely, taking the pivot pins as supporting points of the rotation.

However, when a vegetable is employing the vegetable cutting utensil, it is easy for fine vegetable scraps to go into the pivot grooves and cause clogging, and at that time it is necessary to remove the vegetable scraps in the pivot grooves.

In order to remove the vegetable scraps in the pivot grooves, it is necessary to remove the holding body after removing the screws by means of a screwdriver or the like and to remove the regulating reception plate, and thus such operation is extremely troublesome.

SUMMARY OF THE INVENTION

Accordingly, a technical problem to be solved occurs in order that vegetable scraps and the like which have gone into holes and the like to cause clogging are removed easily in a vegetable cutting utensil which is constructed in such a manner that a flat blade and a comb blade are provided to shred a vegetable and the like, and it is an object of the present invention to solve this problem.

The present invention is proposed in order to attain the object, and a first aspect of the invention is a vegetable cutting utensil constructed in such a way that grooves which are oppositely disposed in a diagonal direction and which are drilled in a horizontal direction on approximately central portions of left and right frame parts in the longitudinal direction of a cutting utensil main body are provided, that a flat blade is inserted into the grooves to be disposed across the left and right frame parts, that a reception plate is fixedly mounted integral with the left and right frame parts in a front side with respect to the flat blade, and that a regulating reception plate which is rotatably attached to the left and right frame parts in a rear side with respect to the flat blade is disposed, wherein the regulating reception plate is detachably formed by allowing respective pivot pins to protrude toward an inner side on inside portions near rear ends of the left and right frame parts while forming respective engaging holes on both side portions near rear ends of the regulating reception plate as well as providing respective opening portions on the engaging holes, so that the pivot pins are fitted into the engaging holes to rotatably support the regulating reception plate and that the pivot pins are engagable via the opening portions of the engaging holes.

According to the first aspect of the invention, since pivot grooves of the prior art example are not formed on the left and right frame parts, vegetable scraps does not remain on the left and right frame parts, and vegetable scraps remaining on the engaging holes of the regulating reception plate can be easily cleaned by detaching the regulating reception plate. Also, cleaning by water washing becomes possible.

A second aspect of the invention is the vegetable cutting utensil as set forth in the first aspect, wherein the engaging holes of the regulating reception plate comprises fitting portions into which the pivot pins are fitted and opening portions which engagably guide the pivot pins, and narrow portions for restricting detachment of the pivot pins are formed on access openings of the fitting portions.

According to the second aspect of the invention, additionally to the effect of the invention as described in the first aspect, the pivot pins become rotatable by means of the fitting portions, the engaging pins become engagable by means of the opening portions, and detachment of the engaging pins can be restricted by means of the narrow portions.

Further, a third aspect of the invention is the vegetable cooking utensil as set forth in the first and second aspects, wherein a comb blade which is disposed across the left and right frame parts and which is juxtaposed with the flat blade is detachably provided on approximately central portion in a longitudinal direction of the left and right frame parts of the cooking utensil main body.

According to the third aspect of the invention, additionally to the effects of the invention as described in the first and second aspects, vegetable or the like can be shredded by means of the comb blade.

DETAILED DESCRIPTION OF THE PREFERRED EMBODIMENT

Figure 1:
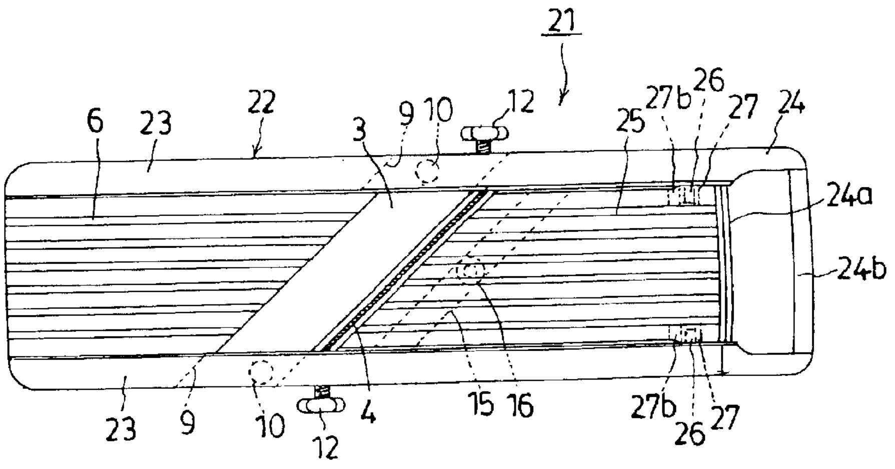
FIG. 1 is a plan view of a vegetable cooking utensil showing one embodiment of the present invention.

One embodiment of the present invention will be explained in detail below according to FIGS. 1 to 5. Like reference numerals are assigned to the same constructive portions as those of the prior art example, and explanation thereof will be omitted for convenience of explanation. In FIG. 1, the reference numeral 21 denotes a vegetable cutting utensil, and in this vegetable cooking utensil 21 a vegetable cutting utensil main body 22 which will be described later is provided with left and right frame parts 23, 23, a holding portion 24, and a regulating reception plate 25, instead of the left and right frame parts (5, 5 in FIG. 6), the holding body (8 in FIG. 6) and the regulating reception plate (7 in FIG. 6) of the vegetable cutting utensil main body (2 in FIG. 6) in the vegetable cutting utensil (1 in FIG. 6) of the prior art example.

Figure 2:
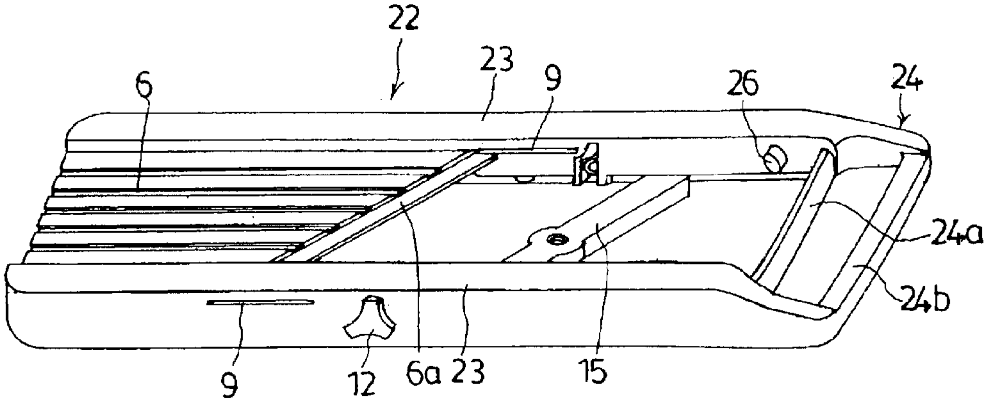
FIG. 2 is a perspective view of a vegetable cooking utensil main body of FIG. 1.
Figure 10:
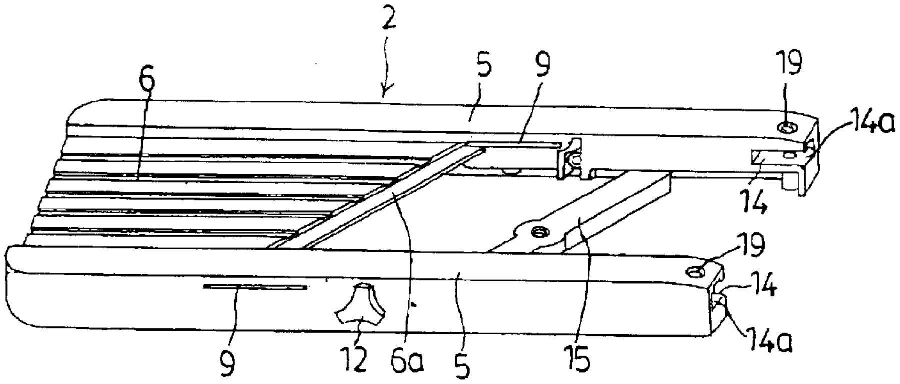
FIG. 10 (Prior Art)
FIG. 10 is a perspective view of a vegetable cooking utensil main body of FIG. 6.
Figure 11:
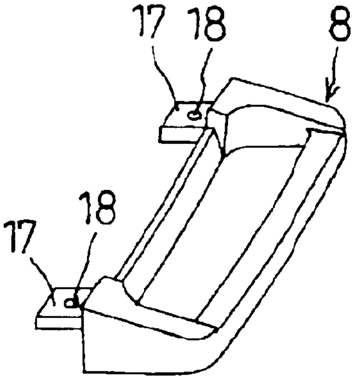
FIG. 11 (Prior Art)
FIG. 11 is a perspective view of a holding body of FIG. 6.

That is, as shown in FIG. 2, regarding the left and right frame parts 23, 23, the conventional pivot grooves (14 in. FIG. 10) are not formed, and respective cylindrical pivot pins 26, 26 which protrude inwardly are provided on inside portions near rear ends of the left and right frame parts 23, 23. At the same time rear end portions of the left and right frame parts 23, 23 are coupled as a unit by means of two coupling portions 24*a*, 24*b* to form the holding portion 24, and the coupling portion 24*b* that is the rear end is holdably formed.

Figure 3:
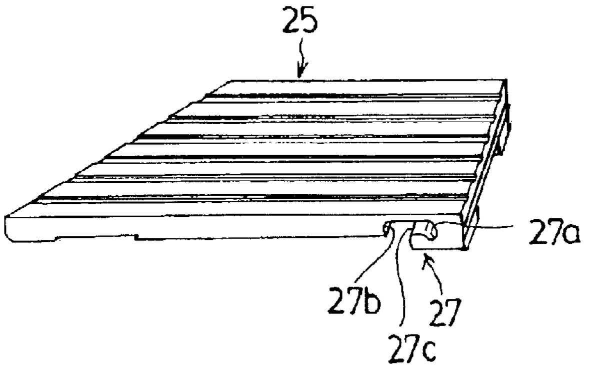
FIG. 3 is a perspective view of a regulating reception plate of FIG. 1.

Meanwhile, as shown in FIG. 3, respective engaging holes 27, 27 for engaging the pivot pins 26, 26 are formed on both side portions near rear ends of the cooking reception plate 25, and these engaging holes 27, 27 consists of fitting portions 27*a*, 27*a* against which the pivot pins 26, 26 are somewhat pressed and into which they are fitted and opening portions 27*b*, 27*b*engagably guiding the pivot pins 26, 26. Narrow portions 27*c*, 27*c* for restricting detachment of the pivot pins 26, 26 are formed on access openings of the fitting portions 27*a*, 27*a*.

When the regulating reception plate 25 is attached to the left and right frame parts 23, 23, the vegetable cooking utensil main body 22 is placed in a horizontal state so that the stay 15 is positioned in an underside as shown in FIG. 2, and the regulating reception plate 25 is moved upwardly from a lower side of space between the coupling portion 24*a* of the holding portion 24 and the pivot pins 26, 26 with the engaging holes 27, 27 in downward positions. Then, the pivot pins 26, 26 are positioned on the opening portions 27*b*, 27*b*, and the cooking reception plate 25 is pressed forwards, so that the pivot pins 26, 26 are guided into the opening portions 27*b*, 27*b*. The cooking reception plate 25 is then strongly pressed upwards, and the pivot pins 26, 26 pass through the narrow portions 27*c*, 27*c* and are fitted into the fitting portions 27*a*, 27*a*.

Figure 4:
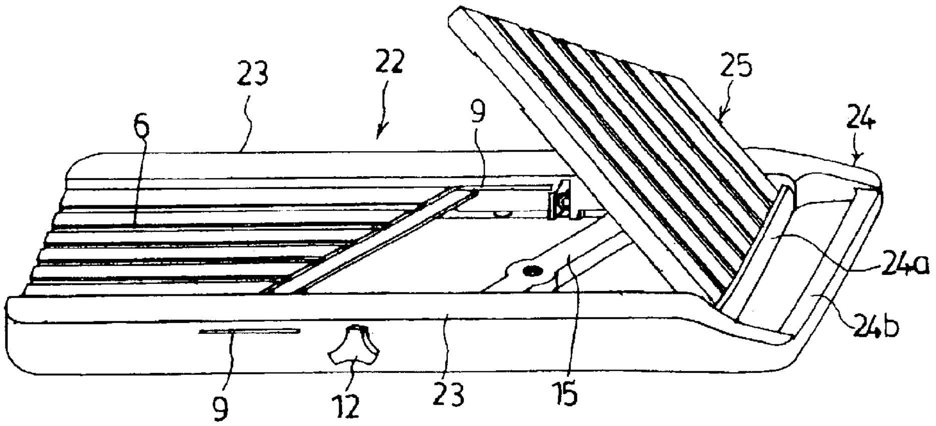
FIG. 4 is a perspective view of the vegetable cooking utensil main body showing a state where the regulating reception plate of FIG. 1 rotates.
Figure 5:
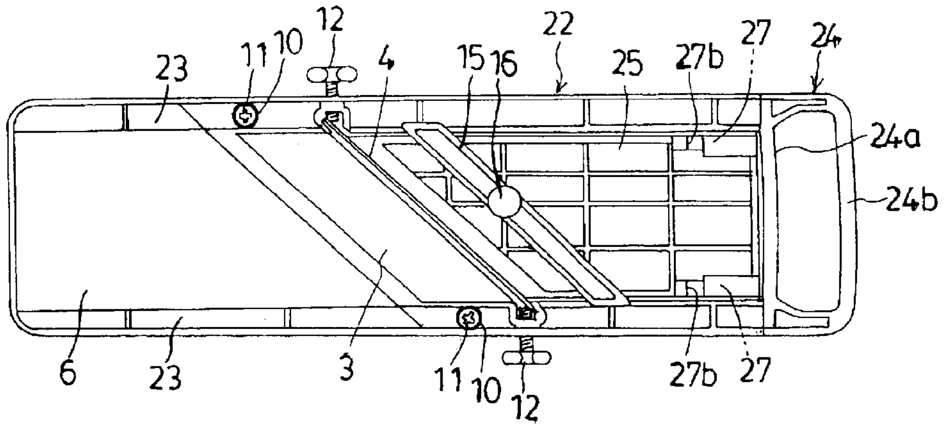
FIG. 5 is a bottom plan view of FIG. 1.
Figure 6:
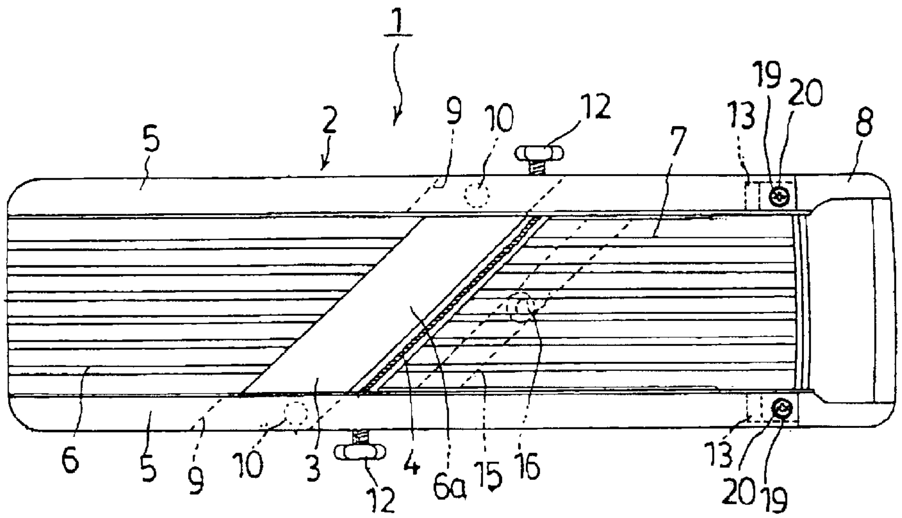
FIG. 6 (Prior Art)
FIG. 6 is a plan view of an example of a conventional vegetable cooking utensil.
Figure 7:
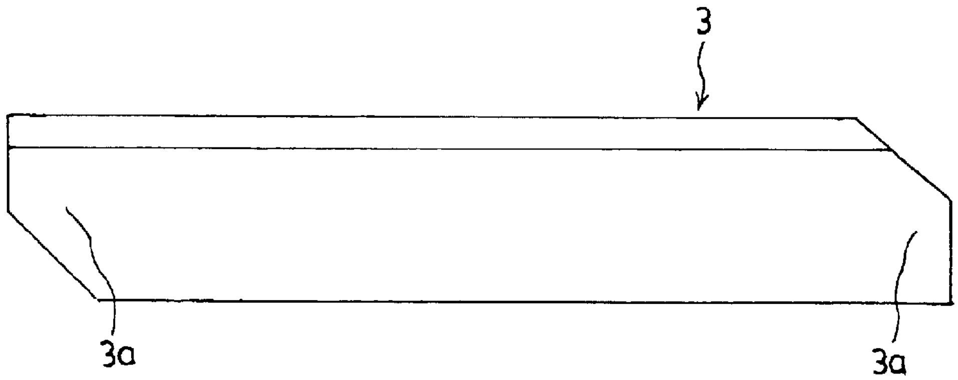
FIG. 7 (Prior Art)
FIG. 7 is a plan view of a flat blade.
Figure 8:
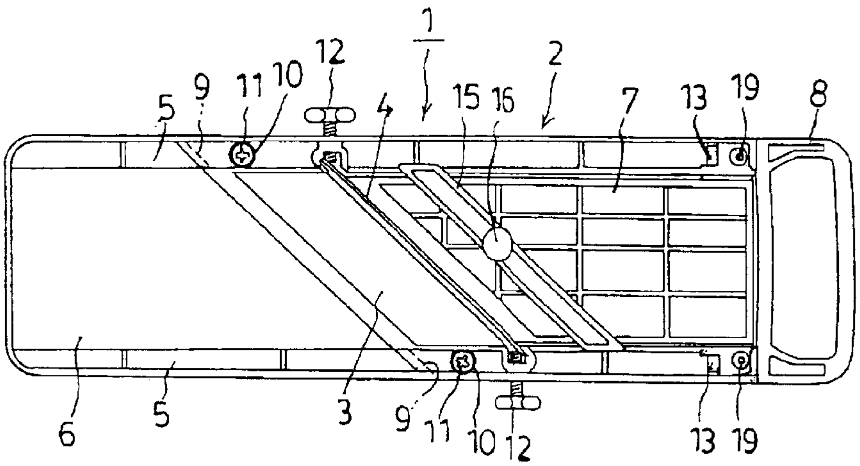
FIG. 8 (Prior Art)
FIG. 8 is a bottom plan view of FIG. 6.
Figure 9:
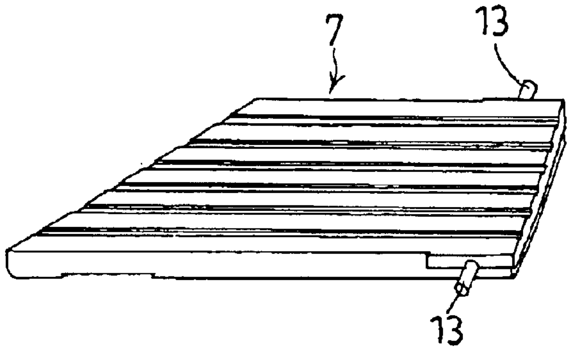
FIG. 9 (Prior Art)
FIG. 9 is a perspective view of a regulating reception plate of FIG. 6.

Then, when the regulating reception plate 25 is rotated in a counterclockwise direction around the pivot pins 26, 26 as shown in FIG. 4, the bottom surface of the regulating reception plate 25 abuts a tip portion of the regulation screw 16 and is supported by the regulating screw 16 as shown in FIG. 5. By regulating the regulation screw 16, the position of the regulating reception plate 25 can be adjusted.

When a vegetable is cut while being slidingly rubbed with the upper surfaces of the reception plate 6 and the regulating reception plate 25, the comb blade 4 scores, and long, thin shredded pieces sliced by the flat blade 3 fall from a gap between the edges of the comb blade 4 and the flat blade 3. It is also possible to detach the comb blade 4 and use only the flat blade 3. In this case, belt-like thin pieces can be obtained.

At this time the pivot pins 26, 26 are restricted by the narrow portions 27*c*, 27*c* to be prevented from being detached, and the rear end portion of the regulating reception plate 25 is restricted by the coupling portions 24*a* of the holding portion 24 to be prevented from being moved backwards.

In the case where vegetable scraps and the like go into the engaging hole 27 and cause clogging, the regulating reception plate 25 is rotated and placed in a vertical state, and then this regulating reception plate 25 is pressed downwards. At that time the pivot pins 26, 26 pass through the narrow portions 27*c*, 27*c*, are guided into the opening portions 27*b*, 27*b*, and are released from the engaging hole 27. When the regulating reception plate 25 is further moved downwards, it can be detached so that vegetable scraps can be easily removed from the engaging hole 27 of the regulating reception plate 25 which has been detached.

Thus, since the pivot grooves of the prior art example are not formed on the left and right frame parts 23, 23 in the vegetable cutting utensil 21, vegetable scraps do not remain on the left and right frame parts 23, 23, and the vegetable scraps remaining in the engaging holes 27, 27 of the regulating reception plate 25 can be cleaned by easily detaching the regulating reception plate 25 by disengaging the pivot pins 26 via the opening portions 27*b*, 27*b*. At that time cleaning by water washing becomes possible. Also, attachment of the regulating reception plate 25 is easy. Further, it is not necessary to use a screwdriver and the like for attachment and detachment of the regulating reception plate 25 as in the prior art example, and handling is extremely easy.

Moreover, since the holding portion 24 is formed integral with the left and right frame parts 23, 23 in the vegetable cutting utensil 21, the manufacturing is easy, contributing to cost reduction, and the strength of the vegetable cutting utensil 21 is drastically improved. Furthermore, since the upper surfaces of the left and right frame parts 23, 23 become a plane surface, causing the holding body fixing holes (19 in FIG. 6) and the screws (20 in FIG. 6) of the prior art example to be unnecessary, the problem that the vegetable scraps remain at and around the holding body fixing holes and screws does not occur.

Various changes may be made in the present invention without departing from the spirit and scope of the invention, and as a matter of course, the present invention extends those which are changed therein.

What is claimed is:

1. A vegetable cutting utensil constructed in such away that grooves which are oppositely disposed in a diagonal direction and which are drilled in a horizontal direction on approximately central portions of left and right frame parts in the longitudinal direction of a cutting utensil main body are provided, that a flat blade is inserted into the grooves to be disposed across the left and right frame parts, that a reception plate is fixedly mounted integral with the left and right frame parts in a front side with respect to the flat blade, and that a regulating reception plate which is rotatably attached to the left and right frame parts in a rear side with respect to the flat blade is disposed, wherein the regulating reception plate is detachably formed by allowing respective pivot pins to protrude toward an inner side on inside portions near rear ends of the left and right frame parts while forming respective engaging holes on both side portions near rear ends of the regulating reception plate as well as providing respective opening portions on the engaging holes, so that the pivot pins are fitted into the respective engaging holes to rotatably support the regulating reception plate and that the pivot pins are engagable via the respective opening portions of the respective engaging holes.

2. The vegetable cutting utensil as set forth in claim 1, wherein the respective engaging holes of the regulating reception plate comprises fitting portions into which the pivot pins are fitted and opening portions which engagably guide the pivot pins, and narrow portions for restricting detachment of the pivot pins are formed on access openings of the fitting portions.

3. The vegetable cutting utensil as set forth in claim 1 or 2, wherein a comb blade which is disposed across the left and right frame parts and which is juxtaposed with the flat blade is detachably provided on approximately a central portion in a longitudinal direction of the left and right frame parts of the cooking utensil main body.

4. A vegetable cutting utensil comprising:

a frame having left and right frame parts;

a blade extending between the left and right frame parts;

a pivot pin extending from each of said left and right frame parts inwards towards each other;

a regulating reception plate adapted to fit within said frame between said left and right frame parts;

an engaging portion placed in each opposing edge of said regulating reception plate and adapted to mate with a respective one of said pivot pins; and an opening portion adjacent each of said engaging portion, whereby a respective one of said pivot pins is fitted into a respective one of said engaging portions to rotatably support said regulating reception plate and said pivot pins are engagable through the opening portion.

5. A vegetable cutting utensil as in claim 4 further comprising:

a narrow portion placed between said opening portion and said engaging portion.

6. A vegetable cutting utensil as in claim 4 wherein:

said blade comprises a flat blade.

7. A vegetable cutting utensil as in claim 6 further comprising:

a comb blade extending between the left and right frame parts adjacent said flat blade.

* * * * *